No. 659,588. Patented Oct. 9, 1900.
C. T. MASON.
TELEPHONE SWITCHBOARD ANNUNCIATOR AND JACK.
(Application filed Nov. 28, 1899.)
(No Model.) 3 Sheets—Sheet 1.
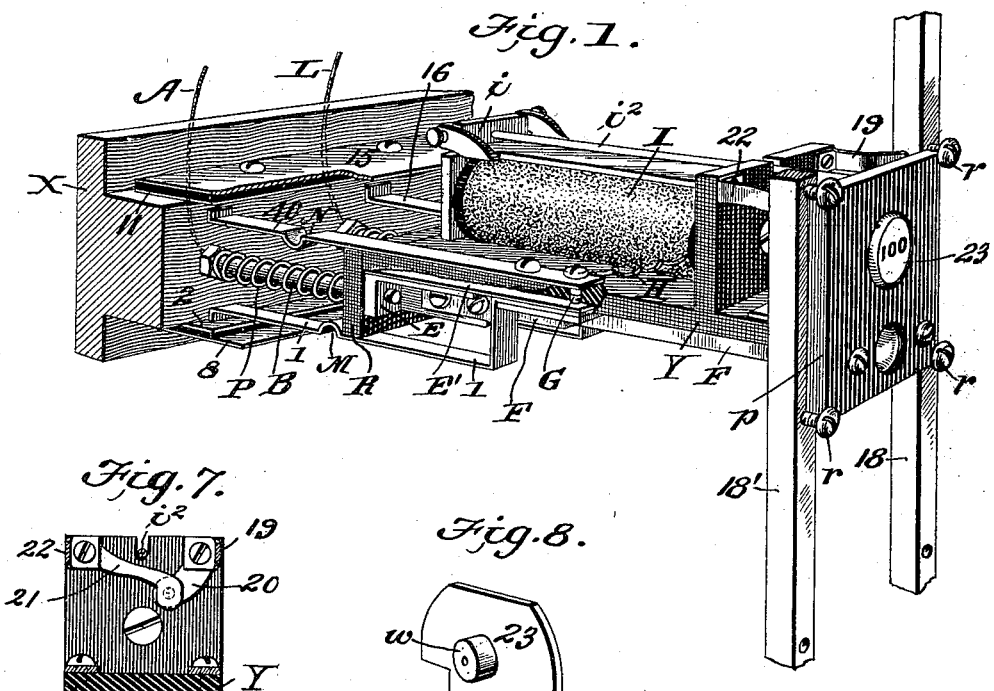
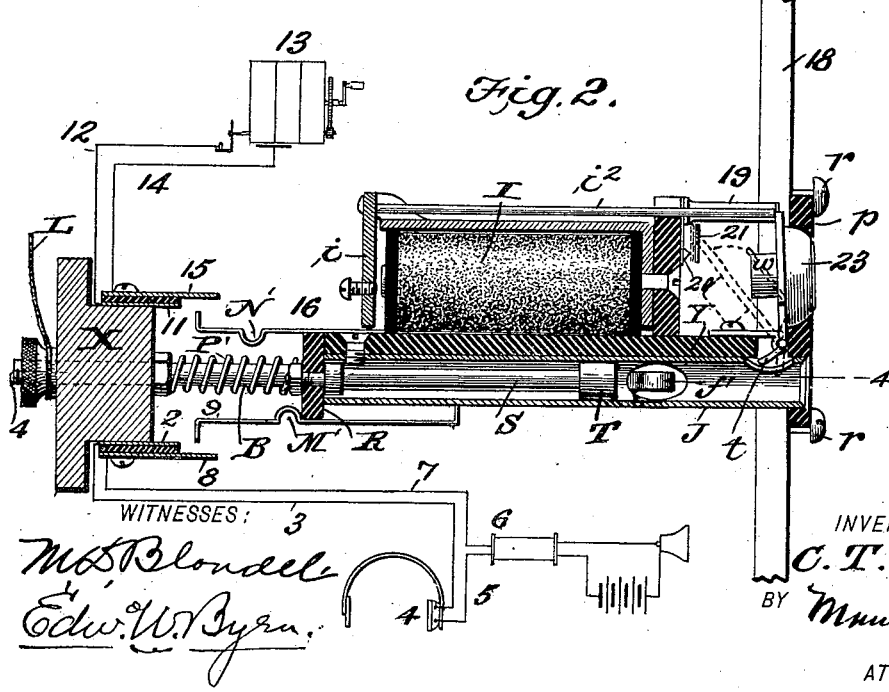
WITNESSES:
M. D. Blondell
Edw. W. Byrn.
INVENTOR
C. T. Mason
BY Munn & Co.
ATTORNEYS
THE NORRIS PETERS CO., PHOTO-LITHO., WASHINGTON, D. C.

No. 659,588. Patented Oct. 9, 1900.
C. T. MASON.
TELEPHONE SWITCHBOARD ANNUNCIATOR AND JACK.
(Application filed Nov. 28, 1899.)
(No Model.) 3 Sheets—Sheet 2.
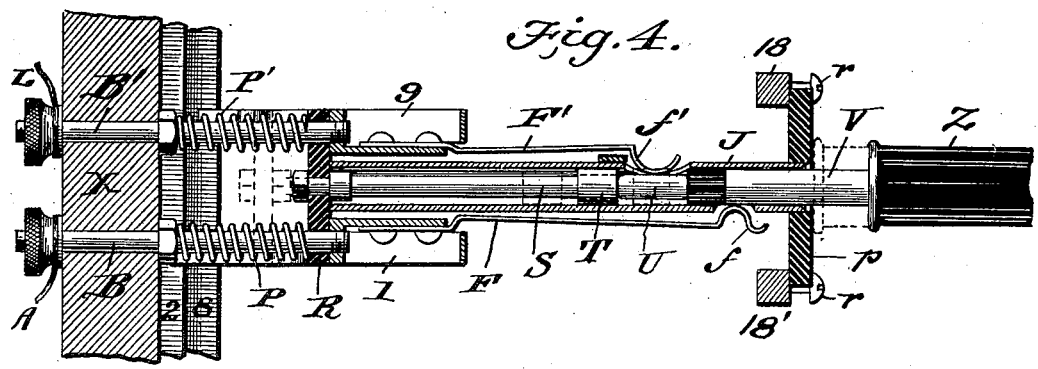
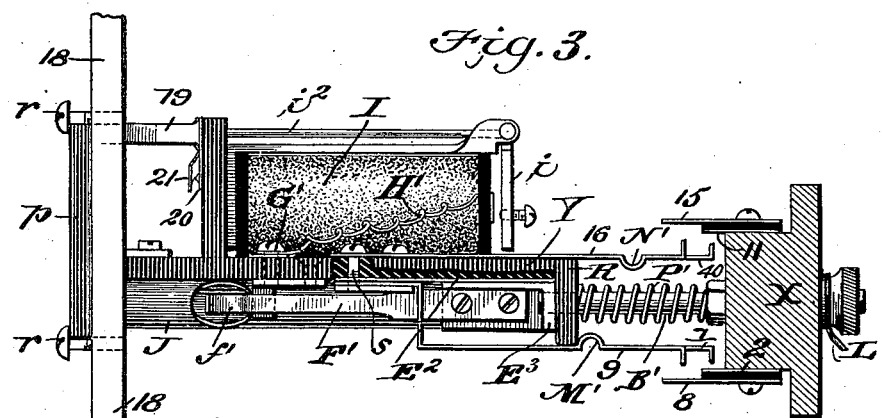
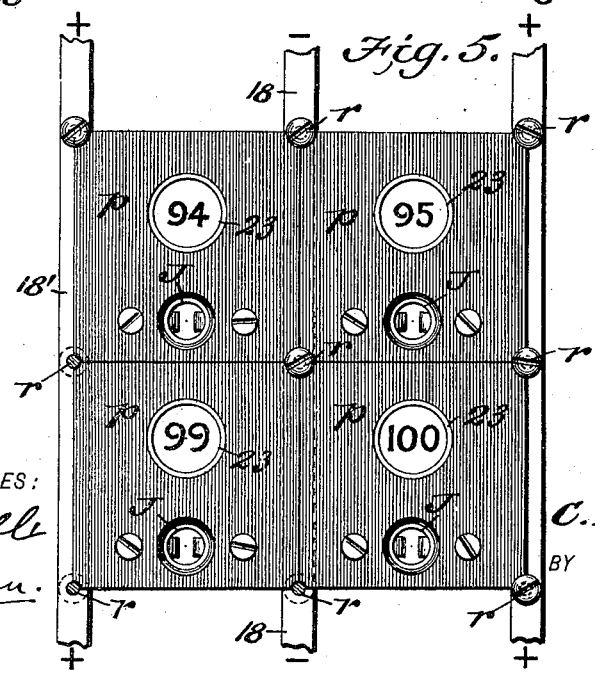
WITNESSES:
M. S. Blondell
Edw. W. Byrn.
INVENTOR
C. T. Mason.
BY Munn & Co.
ATTORNEYS No. 659,588. Patented Oct. 9, 1900.
C. T. MASON.
TELEPHONE SWITCHBOARD ANNUNCIATOR AND JACK.
(Application filed Nov. 28, 1899.)
(No Model.) 3 Sheets—Sheet 3.
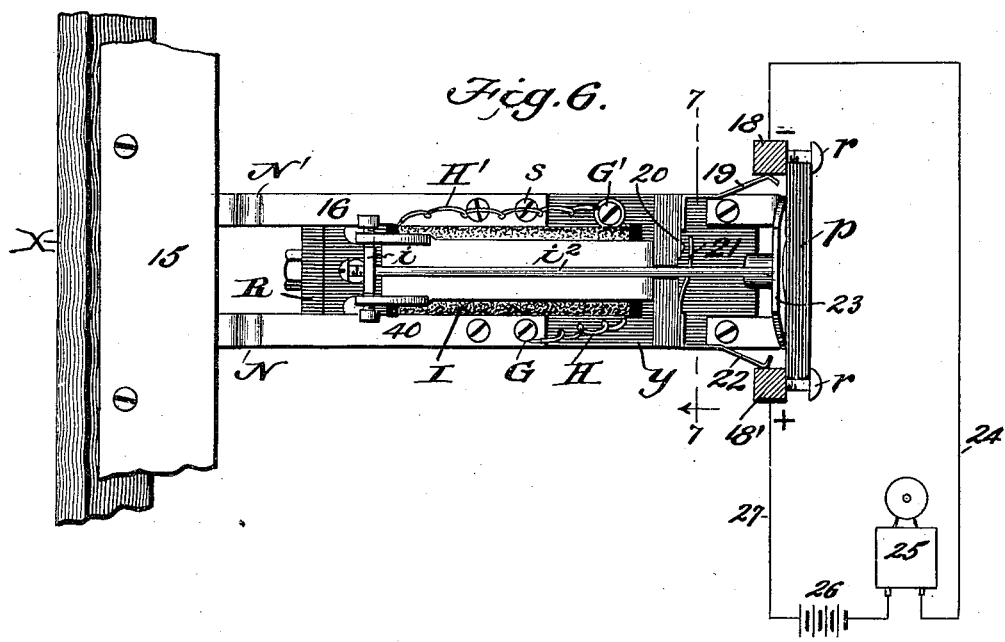
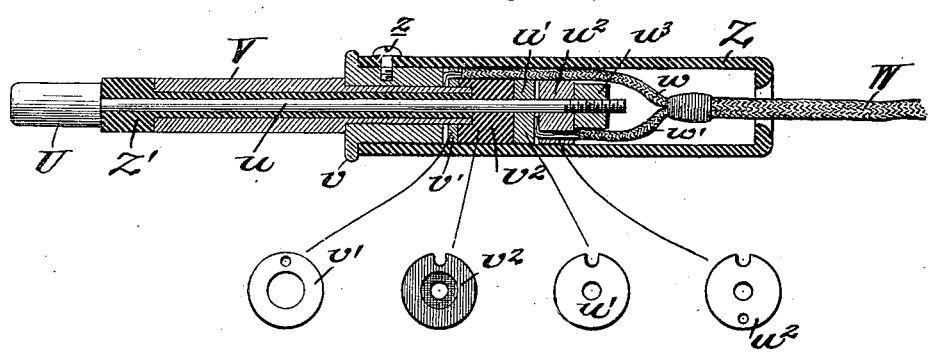
WITNESSES:
M. S. Blondel,
Edw. W. Byrn.
INVENTOR
C. T. Mason.
BY Munn &Co.
ATTORNEYS

UNITED STATES PATENT OFFICE.

CHARLES THOMAS MASON, OF SUMTER, SOUTH CAROLINA.

TELEPHONE-SWITCHBOARD ANNUNCIATOR AND JACK.

SPECIFICATION forming part of Letters Patent No. 659,588, dated October 9, 1900.

Application filed November 28, 1899. Serial No. 738,531. (No model.)

*To all whom it may concern:*

Be it known that I, CHARLES THOMAS MASON, of Sumter, in the county of Sumter and State of South Carolina, have invented a new and useful Improvement in Telephone-Switchboard Annunciators and Jacks, of which the following is a specification.

My invention relates to an improvement in a combined telephone-switchboard annunciator-drop and jack; and it consists of the combination of a spring-jack and indicating instrument or annunciator and springs and metal strips controlling the operator's talking and ringing circuits and means for automatically restoring the annunciator or drop-shutter, all of which are operated solely by the application and adjustment of the plug.

The object of my invention is to make a combination instrument susceptible of adaptation to any of the various arrangements of circuits which are assembled to constitute a telephone-exchange switchboard, the instrument embodying all requisite equipments for a metallic or single-circuit system, including operators' talking and ringing circuits, a series of such instruments forming a central-office switchboard.

A special and specific feature of my invention and one in distinction from all other types is in the drop-shutter falling inwardly, which is a decided improvement and great advantage over all outward-falling shutters. In the first place it can not be thrown by accidental contact with the operator's hand plug or cord while operating the board in answering calls and establishing connections. The clicker or shutter-catch holding the shutter in its restored position is protected by the shutter falling inwardly, inasmuch as it is concealed behind the shutter and drop-front, thus entirely eliminating the possibility of the shutter being thrown by any other than its normal means.

My invention of inward-falling shutter has a further advantage over all types of drops with outward-falling shutters in that the shutter-hinges and other parts requiring careful and permanent adjustment are protected against the liability of being damaged or rendered out of adjustment, as the shutter is shielded behind the drop-front and not exposed to the danger of being knocked, twisted, and damaged, as is the case with the outward-falling shutter.

In the combination covered by my invention all "listening-in" and ringing cams or switches in the connecting cord-circuits may be done away with.

My invention further covers the inwardly-falling drop-shutter mechanically restored by the point of the plug, the shutter being made with an extension or tail below its pivoted part, so that this extension of the shutter shall pass into the jack itself, the shutter being so formed and arranged that its extension or tail while the shutter is down shall be in the jack-throat and not overhanging it, so that the point of the plug immediately upon entering the jack restores the shutter during the first part of its entering movement.

I am well aware of patents in which an outwardly-falling shutter has a cam-like projection on its outside overhanging the path of the plug and designed to be acted on by a projection on a specially-formed plug.

One improvement in my invention is that the shutter falls inwardly and the tail or extension of the shutter extends, when fallen, into the jack and does not overhang the throat, nor does it require any cam shape or special construction of the plug or plug-handle or intermediate springs or devices to restore the shutter, all of which for many practical reasons are not desirable, while in my invention only an ordinary form of plug or plug-handle is required, as any plug that will enter the jack will restore the shutter, owing to the fact and distinctive provision in my invention of the tail or extension of the shutter entering or falling into the throat of the jack while the shutter is down in its inwardly-fallen position. The extension or tail of the shutter employed in my invention is thus simply a part of the shutter and not an attachment to the shutter.

A further advantage and improvement in my invention is the "bull's-eye" signal projection which is an attachment to the shutter projecting through a perforation in the rubber front, making a very conspicuous signal and easily detected when it disappears by the shutter falling inwardly even when viewed at an angle.

Figure 1 is a perspective view, partly broken away. Fig. 2 is a side elevation, partly in section. Fig. 3 is a side elevation from the opposite side with one of the back frame-bars in section. Fig. 4 is a horizontal longitudinal section on line 4 4 of Fig. 2. Fig. 5 is a face view of the annunciator. Fig. 6 is a top plan view of the entire device. Fig. 7 is a vertical cross-section on line 7 7 of Fig. 6 looking in the direction of the arrow. Fig. 8 is a detail in perspective of the drop-shutter. Fig. 9 is a longitudinal section of the plug with side views below of the clamping-washers for the wires.

In the drawings, I, Fig. 2, is the electromagnet that drops the shutter in the usual way by acting upon an armature $i$, working as an elbow-lever of the detent-rod $i^2$ above the magnet, which abuts directly against the inner side of the drop-shutter 23, which is thus held up so that its projecting bull's-eye passes through a countersunk perforation in the rubber face-plate $p$ of the annunciator-face. This shutter is hinged or pivoted at its lower end and has a tailpiece $t$ and also a weight $w$ on its back side to overbalance it and cause it to fall inwardly, as shown in dotted lines, whenever the detent-rod $i^2$ is raised above it by the attraction of the armature $i$ toward the magnet. To accommodate this inward drop, the magnet I is set back a distance from the rubber face-plate $p$, so as to form a little chamber into which the shutter may fall.

Y is the rubber jack-frame, carrying beneath it the jack tube or throat J, which is perforated on its sides (see Fig. 4) to allow the bearing ends $f$ and $f'$ of the two springs F F' to reach to contact with the metal parts of the plug, hereinafter described. These springs F F' are respectively connected to the jack-terminal rods B B', held in the frame-bars X by screw-nuts and connected, respectively, to the line-terminals A and L.

Within the jack-throat J there is a yielding plunger consisting of a head T and a stem S, rigidly connected at its rear end to a rubber cross-head R, perforated and guided on the two jack-terminal rods B B', so as to slide thereon and held to a forward position by helical springs P P', wound around said rods.

Each back frame-bar X has two insulated metal plates 15 and 11 of different widths on top and two corresponding plates 2 and 8 at its lower side, which run continuously along the said bars. The upper pair 15 and 11 form the terminals of the magneto call-generator 13 (see Fig. 2) and the lower pair form terminals for the headpiece and talking-circuit of the operator, as shown by the diagrams in Fig. 2. These terminals are stationary and normally disconnected from the jack, but are brought into coöperation therewith as follows: Two springs 40 and 16 (see Fig. 6) are arranged on the jack-body Y and have bends in them at N N', which when struck by the inward movement of the cross-head R force said springs into contact with the call-generator terminals 15 and 11, and two corresponding springs 1 and 9, Figs. 4, 1, and 2, are provided with corresponding bends M M' and arranged to be brought into contact with the talking-circuit terminals 2 and 8.

As seen from Fig. 2, the act of inserting a plug in the jack when the shutter is down will first restore the shutter by striking with its point the tailpiece $t$, which is in the throat of the jack J. As the plug passes into its normal position the line-springs F and F' are brought into electrical contact with connecting-circuits through the plug, and then to answer the subscriber's call the operator continues the movement of the plug only far enough to close contacts between springs 1 and 9 and strips 2 and 8, Figs. 1, 2, and 3, as later described.

The plug is constructed as shown in Fig. 9. U and V are the metallic surfaces, which are adapted to be brought into contact with the two springs F F' at $f f'$, Fig. 4, and these bearing-surfaces of the plug connect with the two branches $w w'$ of the cord W. The metal end U has a central stem $u$, surrounded by an insulating-sleeve Z', which runs back in the form of a tube that is encompassed by the metal sleeve V. The latter is recessed exteriorly to form a shoulder, and on it is fixed a flanged plug $v$, between which and a metal washer $v'$ the bared wire of the branch $w$ of the cord is clamped. A block of insulation $v^2$ is next behind the parts Z' V $v$ $v'$, and behind this insulating-block two other metal washers $u'$ and $u^2$ clamp the bared wire of the other branch $w'$ of the cord to electrical contact with the central stem $u$ and terminal U. A nut $u^3$ on the stem $u$ serves to clamp all the parts together, and an external rubber case Z is detachably fastened to plug $v$ by screw $z$.

The circuits from lines, as shown in Figs. 1 and 2, are as follows: line A to jack-terminal B, thence to bracket E and metal strip E', to screw G, thence via coil-terminal H to drop-coil I, returning (see Fig. 3) on other side through wire H', anvil G', thence to line-spring F', and to bracket E³ to the other jack-terminal B'. The subscriber's station having signaled "central" by this circuit and thrown the drop-shutter, the operator will answer the call by inserting the plug and pushing against the plunger T to dotted position, Fig. 4, until cross-head R coming in contact with bent portion of springs 1 and 9, Figs. 1, 2, and 3, will close the electrical contacts between spring 1 and strip 2 and spring 9 and strip 8, thus completing the operator's answering or talking circuit as follows, Figs. 1 and 2: line A, jack-terminal B, bracket E to metal strip E', which is in contact with spring 1, thence via spring 1 to metal strip 2, wire 3, operator's receiver 4, wire 5, through secondary winding of induction-coil 6, wire 7, metal strip 8, spring 9, and thence (see Fig. 3) to strip E², thence to bracket-plate E³, thence to jack-terminal rod B', thence to line L, and subscriber's station.

The ringing-circuit for calling-subscriber is established by pushing plug as far into jack as it will go, which (see Figs. 1 and 2) brings the slide R under bent portion N N' of springs 40 and 16, closing the electrical contacts between spring 40 and metal strip 11 and spring 16 and metal strip 15, thus establishing the generator or ringing-circuit as follows: line A to jack-terminal B, bracket E, metal strip E', screw G, spring 40, metal strip 11, wire 12, generator 13, wire 14 to metal strip 15, spring 16, (see Fig. 3,) thence to screw s and plate E², thence to metal bracket E³ and jack-terminal B', and line L to subscriber's station. As soon as plug is released it returns to its normal position in the jack, with line-springs F F' contacting on metal parts of plug, as seen in full lines, Fig. 4, establishing the connection between subscribers' stations. The operator may "listen in" by pushing in the plug only far enough to close the operator's circuit between the contact-plates 2 and 8 and springs 1 and 9, which does not break the connection between subscribers; but by pushing the plug all the way in the connection between operators is broken, ringing only the phone connected with this drop, thus preventing the disagreeable feature of ringing back in the ear-phone of the subscriber waiting for the connection.

The night-bell circuit is clearly shown in Fig. 6. 18 and 18' represent the metal bars to which the drop-fronts p are fastened. These bars are wired in multiple with the night-bell and battery, as shown. The drop-frame is provided with springs 19 and 22, which bind and make electrical contact between said springs and metal bars 18 and 18', leaving a normally-open contact at 20 and 21, which is closed when the shutter 23 falls against spring 21, closing it on the anvil of spring 20, thus establishing the night-bell circuit as follows: anvil 20, spring 19 to metal bar 18, wire 24, through bell and battery 25 and 26, wire 27 to metal bar 18', spring 22 to contact-spring 21. To form the annunciator-front, rubber plates p of aliquot size have at their four corners little recesses to receive one-fourth of the shank of a screw r, by which construction a large annunciator-face may be built up in a simple and practical way, each screw holding the corners of four adjacent plates.

Having thus described my invention, what I claim as new, and desire to secure by Letters Patent, is—

1. A combined telephone annunciator and jack, comprising a horizontal magnet and subjacent jack-throat, a drop-shutter arranged behind the face-plate and hinged below its center but above the jack-throat and adapted to fall inwardly, and having a projection below its hinged point adapted to extend into the throat of the jack when the shutter is down and be restored by the point of the plug coming in contact with said extension as the plug enters the jack substantially as described.

2. A combined telephone annunciator and jack, comprising a horizontal magnet and subjacent jack-throat, a drop-shutter arranged behind the face-plate and hinged below its center but above the jack-throat and adapted to fall inwardly, and having a projection below its hinged point adapted to extend into the throat of the jack when the shutter is down, in combination with a drop-magnet located behind it and having a shutter-support adapted to abut against the top edge of the shutter to hold it upright, substantially as described.

3. In a combined telephone annunciator and jack, an inwardly-falling drop-shutter hinged below its center and having on its front face a projection bearing an indication, in combination with an annunciator face-plate having a perforation through which the said projection protrudes to be visible from an oblique position substantially as described.

4. In a combined telephone annunciator and jack, a drop-shutter hinged below its center and above the jack-throat and arranged to fall inwardly, and having that portion below its hinged point reduced to enable the narrow portion of the shutter to fall into the subjacent jack-throat substantially as and for the purpose described.

5. In a combined telephone annunciator and jack, a drop-shutter located behind the face-plate of the annunciator, and pivoted below its center, with that portion below the pivoted point adapted to extend into the throat of the jack, said shutter having on its front face a projection bearing an indication, in combination with the face-plate having a perforation through which the said projection protrudes substantially as and for the purpose described.

6. In a telephone annunciator and jack, a series of metal supporting-bars, face-plates of non-conducting material of uniform size secured thereto by screws, an inwardly-dropping shutter behind the face-plates, night-bell terminal contacts behind each shutter arranged to be brought into contact by the fall of the shutter, the positive contacts of all the drops being connected to one set of supporting-bars, and the negative ones to the alternating set of said bars, and a battery and bell-circuit connected in multiple to said alternating bars as described.

7. The combination in a telephone-switchboard, of back supporting frame-bars for the jacks, two continuous terminal conductor-plates for the ringing-circuit, said plates being arranged to project one beyond the other and insulated from each other, two spring-bars of different lengths arranged on the jack to contact with these plates but normally out of electrical connection therewith, and means arranged on one side of said spring-bars to bring them simultaneously into contact with the ringing-terminals by the insertion of the plug substantially as described.

8. The combination in a telephone-switchboard, of back supporting frame-bars for the jacks, two continuous terminal conductor-plates for the talking-circuit of the central office, said plates being arranged to project one beyond the other and insulated from each other, two spring-bars of different lengths arranged on the jack to contact with these plates but normally out of connection therewith, and means arranged on one side of said spring-bars to bring them simultaneously into contact with said talking-terminals by the insertion of the plug substantially as described.

9. The combination with the back supporting frame-bars; of four continuous plates arranged two above and two below, and the plates of each pair projecting at different distances and insulated from each other, a jack having four spring-contacts with bearing-points reaching to said plates, and means for projecting them into contact by the insertion of the plug substantially as shown and described.

10. A telephone-jack having a spring-seated plunger in its throat bearing a cross-head at its rear end, jack-springs having bends in them arranged at different distances along their length to be struck by said cross-head to deflect said springs at different points in the travel of the plunger, and contact-plates mounted on the back support normally out of electrical connection with the jack-springs substantially as described.

11. A telephone-jack having two supporting-rods forming line-terminals, with helical springs about the same, a plunger having a cross-head bearing thereagainst, jack-springs arranged above and below the same, and terminal contact-plates for the ringing and talking circuits arranged above and below the jack-springs as described.

12. A telephone-jack having a spring-seated plunger arranged to be advanced by the insertion of the plug, two jack-springs arranged on the same side of said plunger to be deflected by the same and two continuous contact-plates insulated from each other normally out of contact with the jack-springs, and arranged to be touched by said jack-springs when the latter are deflected by the plunger substantially as described.

In testimony whereof I have signed my name to this specification in the presence of two subscribing witnesses.

CHARLES THOMAS MASON.

Witnesses:
F. C. MANNING,
H. L. B. WELLS.